United States Patent [19]

Roseliep

[11] 4,401,401
[45] Aug. 30, 1983

[54] METHOD AND APPARATUS FOR BROACHING

[76] Inventor: Robert E. Roseliep, Grosse Pointe Woods, Mich.

[21] Appl. No.: 299,778

[22] Filed: Sep. 8, 1981

[51] Int. Cl.³ .......................................... B23D 37/00
[52] U.S. Cl. .................................................. 409/244
[58] Field of Search ............... 409/244, 258, 259, 293, 409/297, 304

[56] References Cited

U.S. PATENT DOCUMENTS 2,255,221 9/1941 Lapointe ............................ 409/244
3,849,852 11/1974 Billups ............................ 409/244 X Primary Examiner—William R. Briggs
Attorney, Agent, or Firm—Barnes, Kisselle, Raisch, Choate, Whittemore & Hulbert

[57] ABSTRACT

A method and apparatus for cutting metal from the end of a part partway down the length of the part, especially tooth forms or splines, exterior or interior, by a broaching method, which comprises subjecting the part to a series of cuts, originating at the end of the part and each terminating a predetermined distance less from the end than the preceding cut, to cause the chips from said cut to stack up axially at the end of the cut, and shearing the accumulated chips from the part to provide a finished part.

3 Claims, 13 Drawing Figures

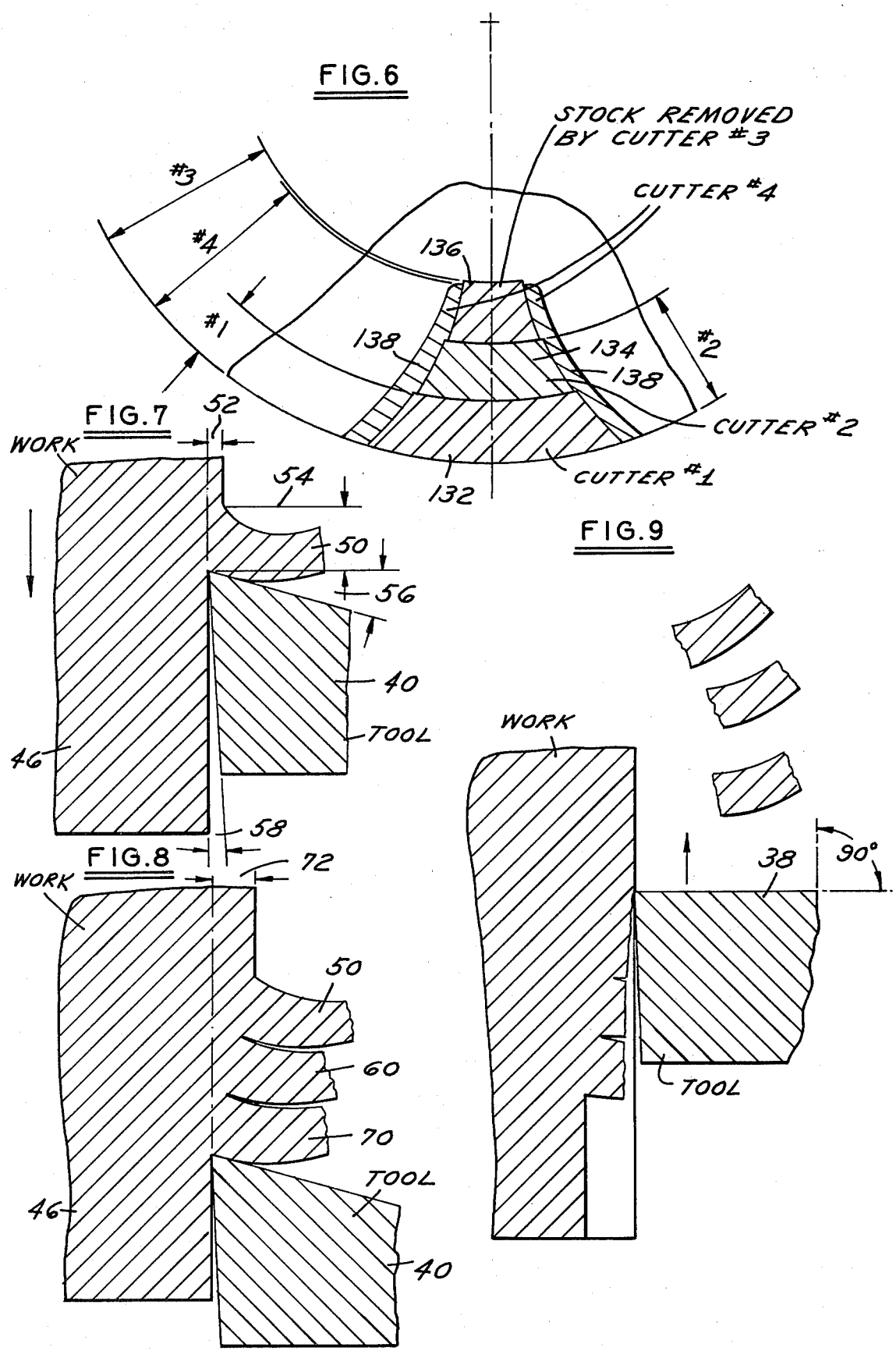

METHOD AND APPARATUS FOR BROACHING

FIELD OF INVENTION

Broaching from the end of a part to an intermediate point and removal of chips without the necessity of an undercut groove.

BACKGROUND OF INVENTION

Broaching may be defined as the cutting away of metal from a part by passing a series of individual cutting teeth mounted on a powered machine slide over the part, each with a progressively deeper cut until the desired depth of cut is obtained.

When broaching for the full length of a part, there is no problem of chip removal since the chips will drop off the part as a tooth reaches the end. However, when the cut is to end midway of the part, the chip remains attached at its uncut root. The removal of the chip has required a second operation either before or after the broach. Preferably, in the past, a relief groove has been cut in the part at the terminal area of the cut and this has, in a sense, provided a false end area where the chips break away and fall from the part. In other cases, the chips could be removed by a subsequent cutting transverse to the broaching direction. In either case, the second operation was time consuming and thus added expense as well as possibly weakening the part by the groove formation. In some cases in a balind hole the chips, still attached at their root, were packed into the base of the hole and left to remain there. The latter method is quite obviously undesirable since some chips might break away and the base of the hole could not be a clean finished surface.

It is an object of the present invention to provide a broaching method which can terminate midway of a part and obtain removal of the rooted chips without the need for an undercut or relief groove.

The invention is directed to a method of broaching forms, either internal or external, on parts requiring the form to run from one edge (point of origin) to an area of permissible cutter generation run but without a separate relief or other operation for chip removal. This method is an alternate machining operation for more conventional machining methods, such as milling and hobbing, both of which utilize circular generating runout areas as the cutter leaves the workpiece.

The method has particular application to the cutting of splines or longitudinal serrations or shafts, both internal and external, but has the advantage that it is not limited to concentric or uniform shapes. It is also applicable to parts which are formed of a material which is of a machinable nature such as would be required for milling or hobbing.

It is desirable that the starting surface, for example, the major diameter of the area to be cut on an external shaft, be held to a tolerance of not more than 0.005", and that this surface extends beyond the runout area for a distance sufficient to accept the total accumulation heights of the chips or curls generated in the completed broaching operation. The cutting is accomplished in the usual broaching concept using a series of individual tooth cutters one following the other in each broaching pass.

Thus, the advantages of a broaching approach to metal removal may be utilized in the removal of metal, such as automatic operations, adaptability to irregular shapes, internal as well as external operations while achieving the necessary chip removal from an uninterrupted surface.

Other objects and features of the invention will be apparent in the following description and claims in which the invention is described together with a disclosure directed to persons skilled in the art to enable the practice of the invention, all in connection with the best mode presently contemplated for the invention.

BRIEF DESCRIPTION OF THE DRAWINGS

DRAWINGS accompany the disclosure and the various views thereof may be briefly described as:

FIG. 6, a composite drawing to illustrate progressive stock removal.

FIG. 7, a diagrammatic view showing the cutting process.

FIG. 8, a view showing chip root stack-up.

FIG. 9, a view of a final trimming cut.

DETAILED DESCRIPTION OF THE INVENTION AND THE MANNER AND PROCESS OF USING IT

The invention lies in a method and apparatus for broaching parts for a surface distance equal to a fraction of the whole surface, and causing the chips progressively cut in the broaching process to stack up at the end of the cut while still attached at their roots, and then shearing the chips adjacent the roots to finish the broaching action. An apparatus in the form of tooling to accomplish the method is part of the invention.

To enable persons skilled in the art to practice the invention, the accompanying drawings are presented in connection with the following description.

Figure 1:
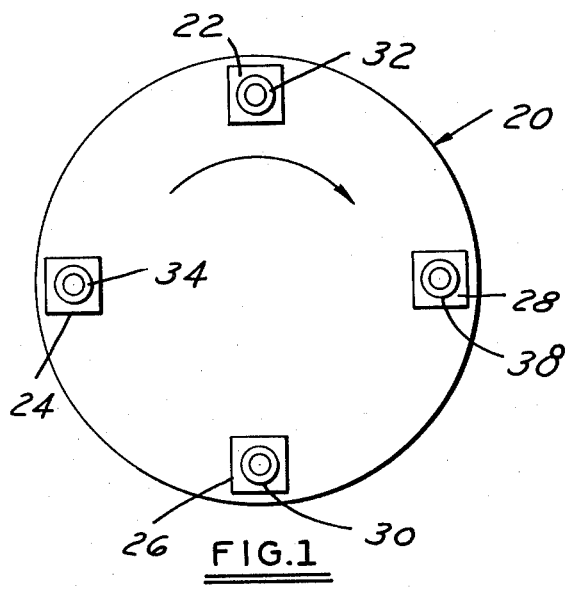
FIG. 1, a diagrammatic plan view of a broach toolholder.

In FIG. 1, a indexable tool head 20 is illustrated in plan view having a plurality of cutter holders 22, 24, 26, and 28 (in this example, four holders) for four broach cutters, 32, 32, 36 and 38. The cutters are short cylinders with internal teeth 40 illustrated in enlarged form in FIG. 3. At one side of the indexable head 20 is a work holding fixture 42 mounted in a powered slide 44. A workpiece in the form of a steel shaft 46 is mounted in the fixture 42. A stabilizing support 48 is provided for a base below the particular tool which is operating on the workpiece at any particular index position.

Figure 4:
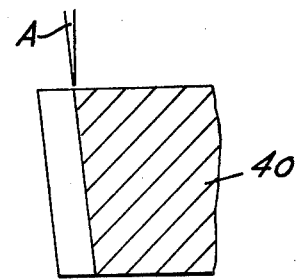
FIG. 4, a section on line 4—4 of FIG. 3.
Figure 5:
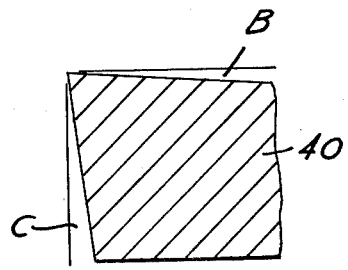
FIG. 5, a section on line 5—5 of FIG. 3.
Figure 2:
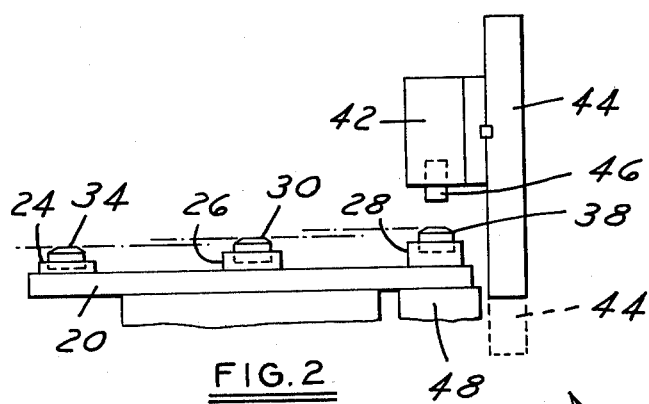
FIG. 2, a side view of the broach toolholder with a powered slide workpiece holder.
Figure 3:
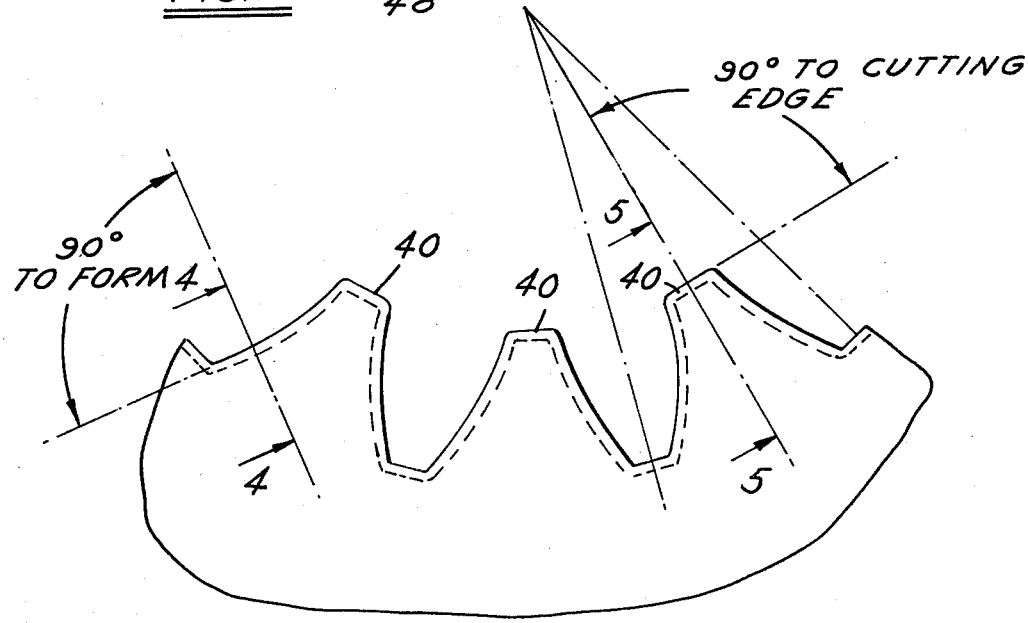
FIG. 3, a plan view of a specific cutter.

Sectioned views of the individual cutter teeth are shown in FIGS. 4 and 5, taken respectively on lines 4—4 and 5—5 of FIG. 3. The angles of the tooth are shown. In FIG. 4, the form relief angle A is illustrated in FIG. 5, the face angle B is shown, and also the cutting relief angle C.

The part 46 is secured in the work holding fixture 42 and broach cutters 32, 34, 36 and 38 are presented one at a time in a scheduled series by indexing of the head 20.

Power movement of the slide 44 forces the work part into each cutter in turn in a precise position of cutter entry and then withdraws the part while the head 20 is indexed. Each cutter is penetrated by the workpiece to a predetermined depth of cut and forms a chip of stock to a precise height as shown in FIG. 7. In FIG. 7, the first chip 50 is shown connected at its root to the workpiece. The depth of cut is shown at 52, the height of the chip generated is shown at 54 and face angle of the cutter at 56. The cutting relief angle is shown at 58.

Each subsequent cut is shorter in length relative to the previous cut and this difference in length is equal to the height of the chip generated by the cutter in use. This is illustrated in FIG. 8 where chips 50, 60 and 70 are shown. The total depth of cut is shown at 72. Thus, the resulting chip pattern stacks the series of chips produced in contact with each other.

After all form producing cutters, in this example, cutters 32, 34 and 36, have completed the form cutting action, a trimming cutter (38 in this example), having an internal diameter slightly larger than part starting surface contour in profile is passed to a position beyond the height of the chip 50 generated by the first cutter, thereby shearing the chips from the part as shown in FIG. 9.

The illustrations in FIGS. 3, 4 and 5 show that the form relief angle should be true and at right angle plane to the profile at all points.

Figure 10:
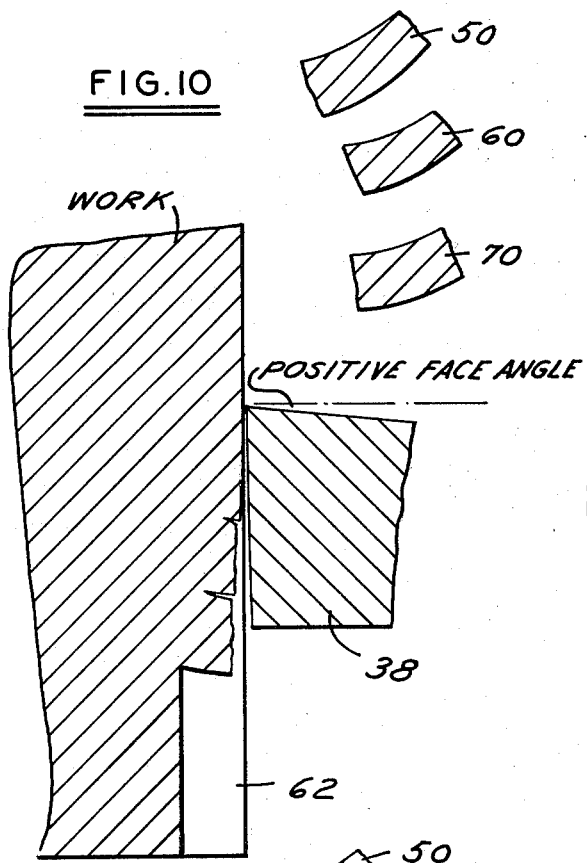
FIG. 10, a view of a modified trim cutter with a positive angle.
Figure 11:
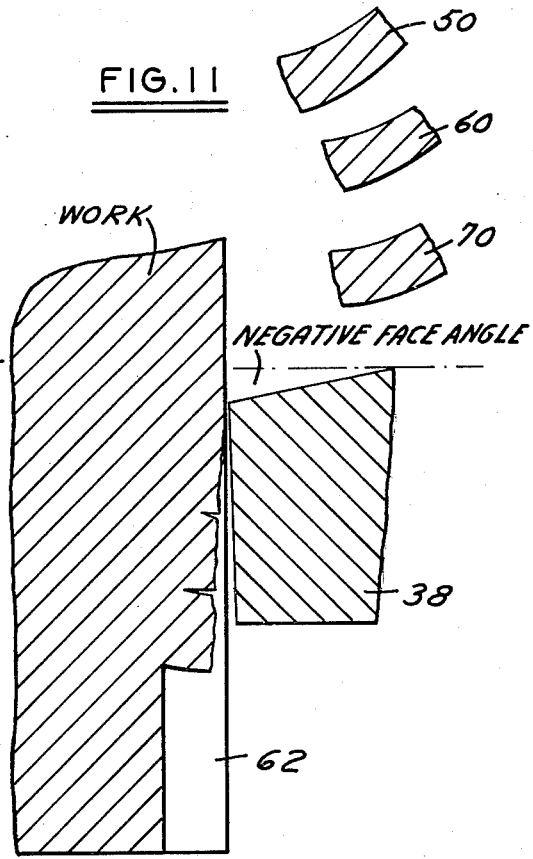
FIG. 11, a view of a trim cutter with a negative angle.
Figure 12:
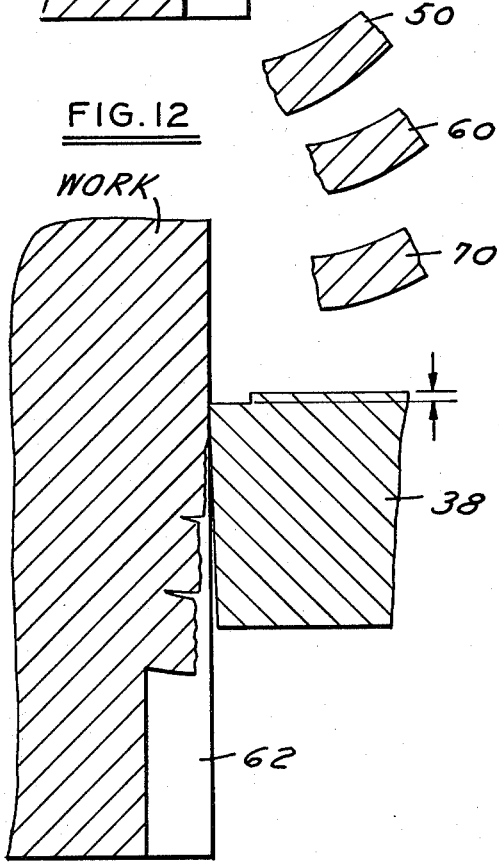
FIG. 12, a view of a trim cutter with a stepped cutting face.

As the cutters are sharpened by grinding the face angle, the form will grow in size by an amount equal to the amount of stock removed at right angle to the cutting direction multiplied by the tangent of the form relief angle. If the form relief angle is not consistent, the form will grow non-uniformly and will result in a loss of tool life. The cutting relief angle may equal or differ from the form relief angle. The face angle may be positive, perpendicular, or negative relative to the cutting direction and this angle will be a factor of material and hardness of the part being cut as illustrated in FIGS. 9, 10 and 11. FIG. 12 shows a stepped cutting face wherein the step may assist in the chip removal somewhat in the same manner as a chipbreaker.

These figures show variations of the trimming broach cutter face angle and FIG. 12 shows a stepped cutting face. The angle and configuration will be selected to allow the trimming cutter to first contact the stack of chips, not at the cutting edge, but rather so as to pull the stack away from the part, thereby allowing the cutting edge to enter the chip as close to the anchoring point as possible.

FIG. 6 shows another example of a cut progression utilizing five cutters. The depth of cut of the respective cutters is shown by the radial arrow-pointed lines carrying numbers 1, 2, 3 and 4. The first three cuts would rough out the stock to the maximum allowable depth of cut. It is to be noted that the tooth form is slightly smaller on each successive cutter in order that it does not drag on the portion previously cut. This is illustrated by the secton segments 132, 134 and 136. This reduction in size is advantageous in cutting ductile materials but is not mandatory.

In this example, cutter No. 4 does not cut as deep as cutter No. 3 to avoid a multiple sided cut that would have a tendency to crowd the formation of the chip. But the fourth cutter is a full form shaver which removes stock at the sides of the groove as shown at 138 in the section segments. This form shaving cutter is important for size and surface finish control of the part. On some profiles, more than one finish cutter may be required.

In each example, the final cutter is slightly larger than the part starting surfaces and acts to contact the last cut chip, pushing the chips against each other and tearing the chips off at the roots as shown in FIGS. 9, 10, 11 and 12.

One surprising result of the method and apparatus is that with most materials the chips are removed without leaving any jagged projections extending beyond the flutes or gear teeth on the part. A tube, for example, having an inch and one quarter diameter has been cut with over 50 splines spaced circumferentailly on the outer surface and three-quarters in axial length. The chips are torn free and removed cleanly and leaving no extending barbs.

Figure 13:
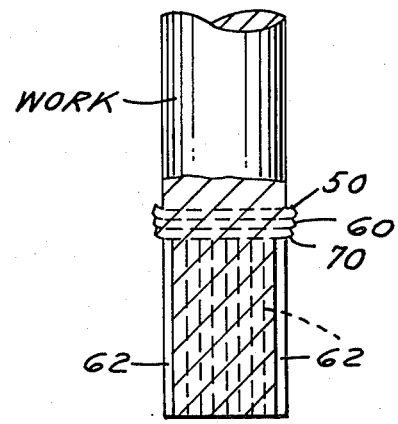
FIG. 13, an elevational view of a work part with formed grooves.

In FIG. 13, a cylindrical work part 46 is shown partially in section with grooves 62 formed therein. The circumferentially spaced chips 50, 60 and 70 at the end of each groove are shown in the overlying stacked relationship illustrated in enlarged dimensions in FIG. 8. This showing is prior to the final step in which the chips are sheared and torn from their cut position as shown in FIG. 9.

What I claim is:

1. A process of broaching a formed part for a predetermined distance from the end of the part in a series of cuts with individual broaching teeth, which comprises moving the part relative to said series of teeth to cut progressively deeper into said part with each tooth, said cuts terminating at an uninterrupted surface of the part in progressively decreasing lengths to cause the chips of said progressive cuts to project radially and stack up axially in close proximity to each other, and shearing said chips simultaneously from said part with a final tool pass which contacts only the chips.

2. A process of broaching a formed part having a predetermined contour in a plane normal to the axis of the part, and for a predetermined distance from the end of a part along said axis to an uninterrupted surface of the part without runout which comprises creating relative movement of a plurality of broach tools from the end of said part in radially progressively deeper cuts and axially decreasing lengths of cuts to cause chips from each of said cuts to extend radially from the surface of said part and to lie adjacent each other axially at the end of said cuts, and shearing and tearing said chips from said part by a final pass of a tool axially of said part to contact said radially extending chips and remove them from the surface of said part.

3. A method of forming a plurality of radially spaced lands and grooves in the form of splines or teeth in a formed part having a predetermined contour in a plane normal to the axis of said part to an uninterrupted surface of the part without runout which comprises causing a relative movement along said axis between the part and a series of tools matching the contour of said part having spaced teeth to cut radially spaced grooves in the surface of said part, said tools being dimensioned to cut progressively deeper grooves in the surface of said part to a predetermined depth in progressively shorter axial lengths to cause chips from said cuts to extend radially from the surface of said part and to stack axially adjacent each other at the ends of said cuts, and shearing and tearing said chips from the surface of said part by passing a final tool axially to contact the last cut of said chips and remove all of said chips in an axial motion along the surface of said part.

* * * * *